(12) United States Patent
Amarendra et al.

(10) Patent No.: US 11,645,378 B2
(45) Date of Patent: May 9, 2023

(54) DOCUMENT SECURITY KEYS

(71) Applicant: Hewlett-Packard Development Company, L.P., Spring, TX (US)

(72) Inventors: Shakti Amarendra, Bangalore (IN); Vasu Agrawal, Bangalore (IN); Balaji Yalamarthi, Bangalore (IN); Anusha Ghali, Bangalore (IN); . Sharanabasappa, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 2 days.

(21) Appl. No.: 17/047,087

(22) PCT Filed: Feb. 11, 2019

(86) PCT No.: PCT/US2019/017414
§ 371 (c)(1),
(2) Date: Oct. 13, 2020

(87) PCT Pub. No.: WO2019/212619
PCT Pub. Date: Nov. 7, 2019

(65) Prior Publication Data
US 2021/0150015 A1    May 20, 2021

(30) Foreign Application Priority Data
May 2, 2018  (IN) .......................... IN201841016493

(51) Int. Cl.
*G06F 21/00* (2013.01)
*G06F 21/35* (2013.01)
*G06F 21/44* (2013.01)
*G06F 21/60* (2013.01)

(52) U.S. Cl.
CPC .............. *G06F 21/35* (2013.01); *G06F 21/44* (2013.01); *G06F 21/602* (2013.01)

(58) Field of Classification Search
CPC ......... G06F 21/35; G06F 21/44; G06F 21/602
See application file for complete search history.

(56) References Cited

U.S. PATENT DOCUMENTS

| | | |
|---|---|---|
| 7,567,364 B2 | 7/2009 | Martin et al. |
| 9,035,958 B2 | 5/2015 | Gopalasamy |
| 9,209,975 B2 | 12/2015 | Uchida et al. |
| 9,690,628 B2 | 6/2017 | Engholm et al. |
| 9,887,980 B1 | 2/2018 | Balmakhtar et al. |
| 2006/0151607 A1 | 7/2006 | Horikiri et al. |

(Continued)

FOREIGN PATENT DOCUMENTS

| | | | | |
|---|---|---|---|---|
| EP | 1912424 B1 | 8/2015 | | |
| WO | WO-2005043361 A2 * | 5/2005 | ........... | G06F 21/608 |

(Continued)

*Primary Examiner* — Philip J Chea
*Assistant Examiner* — Rodman Alexander Mahmoudi
(74) *Attorney, Agent, or Firm* — Brooks, Cameron & Huebsch, PLLC

(57) ABSTRACT

Examples disclosed herein relate to receiving an authentication credential from a user, generating a security key associated with a physical document selected for an image capture operation, receiving a request for a captured image file of the physical document, and providing the captured image file of the physical document upon determining that the request comprises the security key.

13 Claims, 3 Drawing Sheets

(56) References Cited

U.S. PATENT DOCUMENTS

| | | | |
|---|---|---|---|
| 2007/0223955 A1* | 9/2007 | Kawabuchi | G03G 21/04 |
| | | | 399/80 |
| 2015/0089615 A1* | 3/2015 | Krawczyk | G06F 16/93 |
| | | | 726/7 |
| 2015/0324640 A1* | 11/2015 | Macciola | G06K 9/18 |
| | | | 382/112 |
| 2016/0050199 A1 | 2/2016 | Ganesan et al. | |
| 2016/0364550 A1* | 12/2016 | Pathak | H04L 63/0428 |
| 2017/0118025 A1* | 4/2017 | Shastri | H04L 63/0861 |
| 2019/0349340 A1* | 11/2019 | Zhang | H04L 9/0861 |

FOREIGN PATENT DOCUMENTS

| | | |
|---|---|---|
| WO | WO-2005043361 A3 | 8/2005 |
| WO | WO-2008024546 | 2/2008 |

\* cited by examiner

DOCUMENT SECURITY KEYS

BACKGROUND

Multi-function devices often combine different components such as a printer, scanner, and copier into a single device. Such devices frequently enable network access to their functions, such as scanning documents to a file that may then be retrieved from other network-connected devices, such as smartphones and computers.

Figure 1:
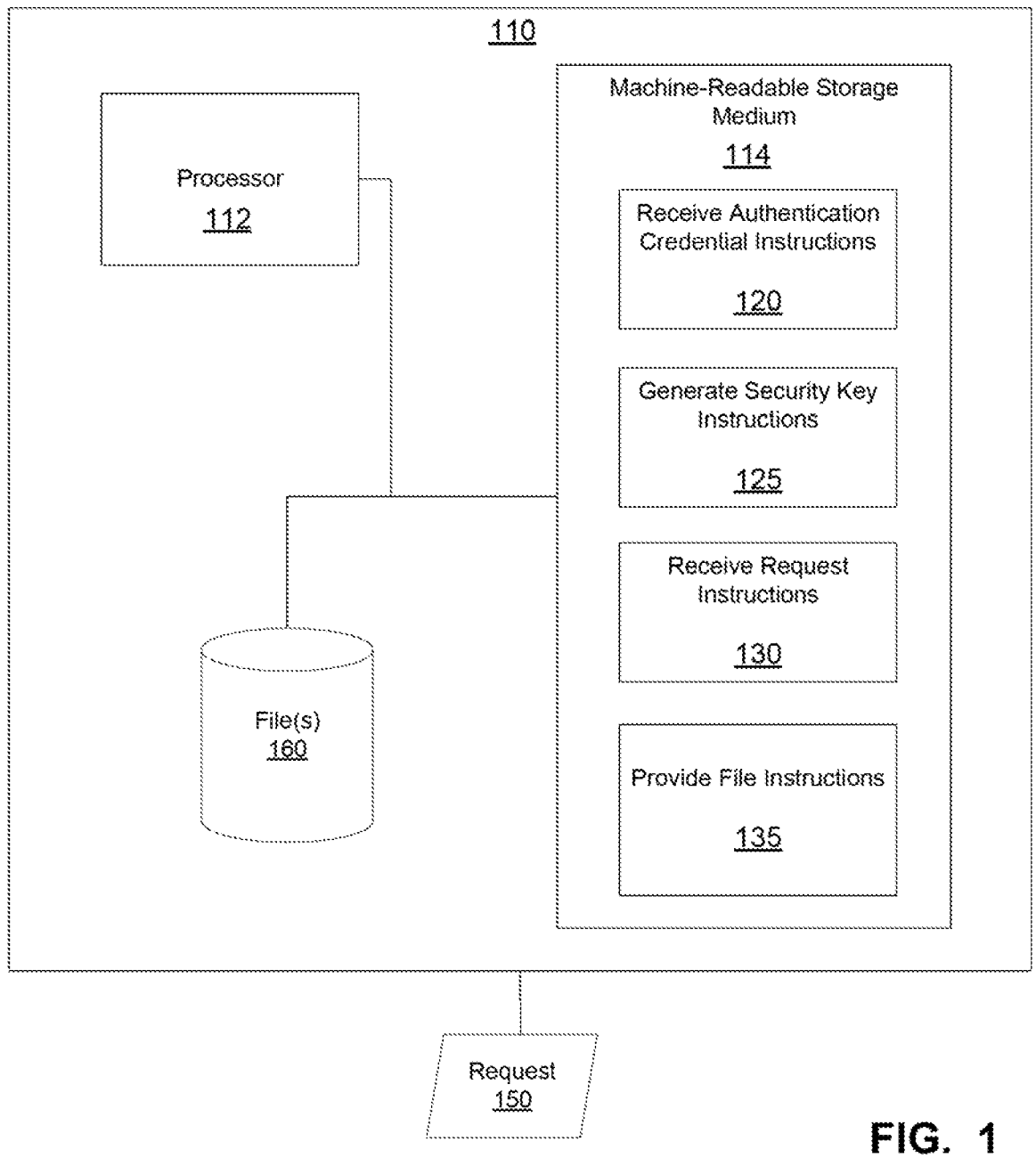
FIG. 1 is a block diagram of an example computing device for providing document security keys.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, including an option to scan a physical document and send it to a user-specified email address. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

The optical assembly may capture an image of the document for storage in a digital file format. For example, the optical assembly may comprise a light source and an image sensor. The image sensor may be a linear image sensor or an array of image sensors that spans a width of a document to be scanned. The light source may be a linear light source, such as a florescent tube, an array of light sources, such as a series of light emitting diodes (LEDs), or a light guide with a point light source or sources. The light source may emit light through the scan window onto the medium to be scanned while the image sensor captures light reflected by the medium through the scan window. A lens or array of lenses, such as a rod lens array, may be provided to focus light on the image sensor.

Once captured, the image of the document may be stored in a digital file format such as a portable document format (PDF), a tagged image file format (TIFF), JPEG, etc. Such files may be stored on the MFP and/or in another storage device, such as a network-attached storage, external drive, cloud service, etc. The file may be accessed in numerous ways, such as emailing to a user and/or retrieved by following a web-based link to the files storage location.

The convenience of pervasive scanning, however, has the potential to offer a security loophole as physical documents may be captured as images and secured, but the physical pages themselves may be left insecure. For example, a user may scan a document, but forget the physical pages and leave them on the scanning device. Another user may then use that physical copy to create another, unauthorized scan and/or copy.

In some implementations described herein, unauthorized re-scans/copies may be prevented. The scanning device may, for example, create a fingerprint of the document prior to and/or during a copy/scan operation and generate a security key associated with that fingerprint. The security key may be based upon characteristics of the document (e.g., number of pages, page size, color profile, content, etc.), characteristics of a resulting scan file (e.g., file type, file size, checksum, metadata, etc.), and/or characteristics associated with a user (e.g., username, mobile device identifier, authentication credential, etc.). Afterward, attempts to create additional scans/copies and/or to access the resulting file from the original scan may require the generated security key. The security key may, for example comprise a randomly generated password using, for example, one of the above listed characteristics as a seed, a public/private key pair, a biometric security requirement, etc. If an attempt is made, for example, to create another scan, the device may request the security key and, if it is not received, the device may refuse to perform the operation, capture the document (e.g., accept the physical document from a sheet feeder but keep it inside the device rather than passing it through to a document output tray), and/or notify and/or request authorization from the user associated with the physical document of the unauthorized attempt.

FIG. 1 is a block diagram of an example computing device 110 for providing document security keys. Computing device 110 may comprise a processor 112 and a non-transitory, machine-readable storage medium 114. Storage medium 114 may comprise a plurality of processor-executable instructions, such as receive authentication credential instructions 120, generate security key instructions 125, receive request instructions 130, and provide file instructions 135. In some implementations, instructions 120, 125, 130, 135 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130, 135.

Executable instructions 120, 125, 130, 135 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive authentication credential instructions 120 may receive an authentication credential from a user. In some implementations, the authentication credential may be received from a mobile device of the user. The authentication credential received from the mobile device may comprise, for example, a device identifier (e.g., a MAC address, IMEI number, etc.), a user identifier, a password, and a user selected credential (e.g., a personal identification number).

Generate security key instructions 125 may generate a security key associated with a physical document selected for an image capture operation. In some implementations, the security key may be generated according to the authentication credential associated with the user, a characteristic of the physical document (e.g., number of pages, media size, color or mono characteristics, etc.) and/or a characteristic of the image capture operation (e.g., file size, quality, file type, file name etc.). For example, a key may be generated randomly using a seed value based on any and/or all of the authentication credential, document characteristic, and/or operation characteristic. The security key may be associated with a resulting file name of the captured document image and encapsulated as metadata within the stored file.

In some implementations, the security key may be provided to the user, such as by a same channel used to receive the user's authentication credentials by instructions 120 (e.g., Bluetooth, WiFi, etc.) and/or via another channel, such as associating the key with a user's account and/or sending the key via email, SMS/text, HTTPS, etc.

Receive request instructions 130 may receive a request for a captured image file of the physical document. In some implementations, the request for the captured image file may comprise a request to perform the image capture operation on the physical document and/or a request for a copy of a stored version of the captured image file. For example, the physical document may not have been scanned before the key is generated by instructions 125, in which case the request may be to perform a first scan operation on the document. For another example, the physical document may have already been scanned and the request may be to perform a second scan operation and/or may comprise a request for a resulting file from the first scan operation.

The request may be evaluated to determine whether the generated security key has been provided, and the request for the file and/or operation may be denied if not. In some implementations, instructions 130 may notify the user of a unauthorized attempt to request the captured image file upon determining that the request does not comprise the security key.

Provide file instructions 135 may provide the captured image file of the physical document upon determining that the request comprises the security key. For example, device 110 may transmit the file to the user according to the request, such as by transferring the data over a network connection to a user-selected storage location, emailing the file, sending the file to the requesting user's computing and/or mobile device, etc.

Figure 2:
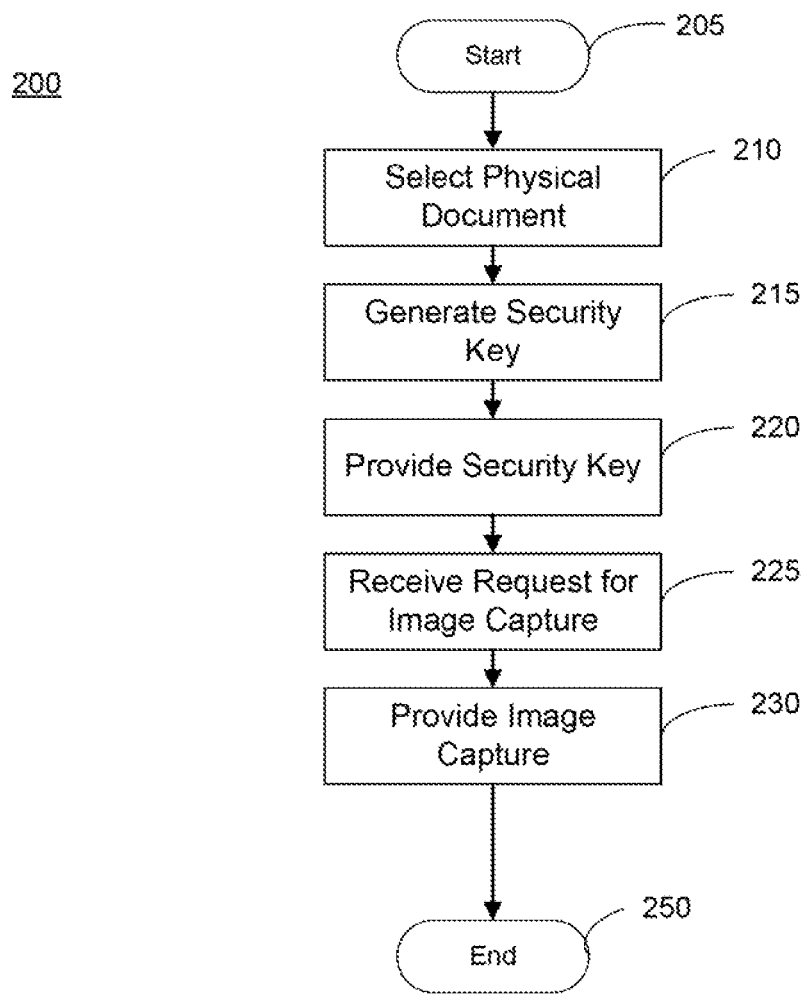
FIG. 2 is a flowchart of an example method for providing document security keys.

FIG. 2 is a flowchart of an example method 200 for document security keys. Although execution of method 200 is described below with reference to computing device 110, other suitable components for execution of method 200 may be used.

Method 200 may begin at stage 205 and advance to stage 210 where device 110 may select a physical document for an image capture. For example, the user may place a document on and/or into a scanning device, such as by loading the physical document into a document feeder tray and/or placing the document on a flatbed scanner surface.

Method 200 may then advance to stage 215 where computing device 110 may generate a security key associated with the physical document. In some implementations, generating the security key may comprise generating the security key according to an authentication credential associated with the user, a characteristic of the physical document and/or a characteristic of the image capture.

Method 200 may then advance to stage 220 where computing device 110 may provide the security key to a user associated with the physical document. In some implementations, the security key is provided to a mobile device associated with the user. For example, generate security key instructions 125 may generate a security key associated with a physical document selected for an image capture operation. In some implementations, the security key may be generated according to the authentication credential associated with the user, a characteristic of the physical document (e.g., number of pages, media size, color or mono characteristics, etc.) and/or a characteristic of the image capture operation (e.g., file size, quality, file type, file name etc.). For example, a key may be generated randomly using a seed value based on any and/or all of the authentication credential, document characteristic, and/or operation characteristic. The security key may be associated with a resulting file name of the captured document image and encapsulated as metadata within the stored file.

In some implementations, the security key may be provided to the user, such as by a same channel used to receive the user's authentication credentials by instructions 120 (e.g., Bluetooth, WiFi, etc.) and/or via another channel, such as associating the key with a user's account and/or sending the key via email, SMS/text, HTTPS, etc. In some implementations, providing the security key to the mobile device associated with the user further may comprises verifying that the mobile device associated with the user is associated with a trusted whitelist table of a plurality of mobile devices.

Method 200 may then advance to stage 225 where computing device 110 may receive a request for the image capture of the physical document. In some implementations, the request may be received from a second device associated with the user. For example, the second device may comprise another computing device, such as a laptop or desktop computer, associated with the user that may be configured to retrieve the security key from the mobile device.

In some implementations, receive request instructions 130 may receive a request for a captured image file of the physical document. In some implementations, the request for the captured image file may comprise a request to perform the image capture operation on the physical document and/or a request for a copy of a stored version of the captured image file. For example, the physical document may not have been scanned before the key is generated by instructions 125, in which case the request may be to perform a first scan operation on the document. For another example, the physical document may have already been scanned and the request may be to perform a second scan operation and/or may comprise a request for a resulting file from the first scan operation.

The request may be evaluated to determine whether the generated security key has been provided, and the request for the file and/or operation may be denied if not. In some implementations, instructions 130 may notify the user of a unauthorized attempt to request the captured image file upon determining that the request does not comprise the security key.

Method 200 may then advance to stage 230 where computing device 110 may provide the image capture of the physical document upon a determination that the request comprises the security key. For example, provide file instructions 135 may provide the captured image file of the physical document upon determining that the request comprises the security key. For example, device 110 may transmit the file to the user according to the request, such as by transferring the data over a network connection to a user-selected storage location, emailing the file, sending the file to the requesting user's computing and/or mobile device, etc.

Method 200 may then end at stage 250.

Figure 3:
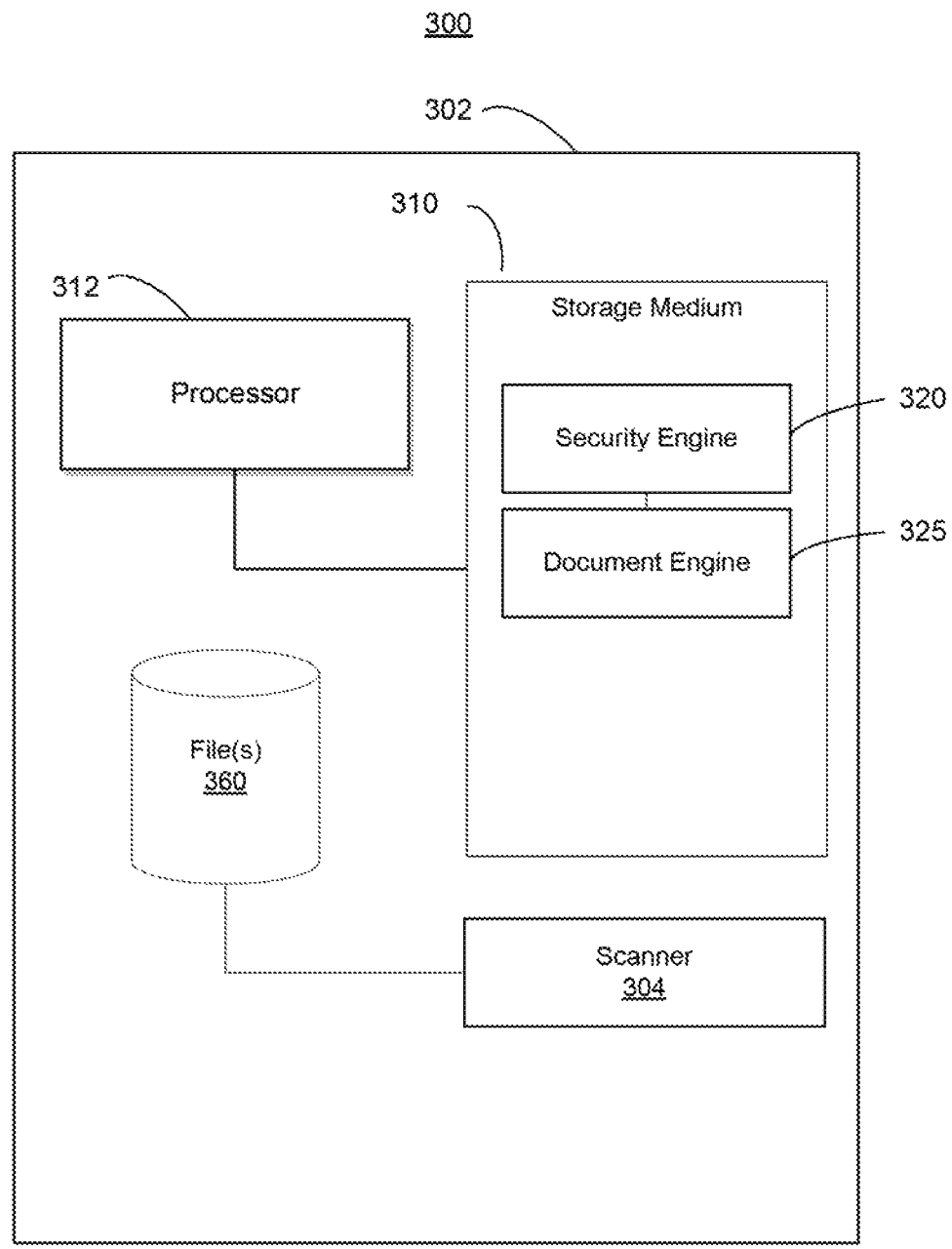
FIG. 3 is a block diagram of an example system for providing document security keys.

FIG. 3 is a block diagram of an example apparatus 300 for providing document security keys. Apparatus 300 may comprise a multi-function printer device 302 comprising a scanner 304, a storage medium 310, and a processor 312. Device 202 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a security engine 320 and a document engine 325.

Each of engines 320, 325 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Scanner 304 may receive a physical document and capture an image file 360 associated with the physical document. For example, device 302 may comprise a scanner component operable to capture a digital representation of a physical document. Such a scanner component may comprise a camera and/or a sheet-fed, flat-bed, and/or drum scanner. The scanner may, for example use a charge-coupled device (CCD), a photomultiplier tube (PMT), and/or a contact image sensor (CIS) as an image sensor.

Security engine 320 may generate a security key associated with the physical document according to an authentication credential associated with a user and provide the security key to a user associated with the physical document. For example, security engine 320 may execute generate security key instructions 125 to generate a security key associated with a physical document selected for an image capture operation. In some implementations, the security key may be generated according to the authentication credential associated with the user, a characteristic of the physical document (e.g., number of pages, media size, color or mono characteristics, etc.) and/or a characteristic of the image capture operation (e.g., file size, quality, file type, file name etc.). For example, a key may be generated randomly using a seed value based on any and/or all of the authentication credential, document characteristic, and/or operation characteristic. The security key may be associated with a resulting file name of the captured document image and encapsulated as metadata within the stored file.

In some implementations, the security key may be provided to the user, such as by a same channel used to receive the user's authentication credentials by instructions 120 (e.g., Bluetooth, WiFi, etc.) and/or via another channel, such as associating the key with a user's account and/or sending the key via email, SMS/text, HTTPS, etc.

In some implementations, the security key may be generated and/or shared only for a specific client device of the user. For example, details of such specific client devices may be stored in a trusted whitelist table maintained by the security engine 320 in storage medium 310 and/or in another storage device, such as a network-attached storage, external drive, cloud service, etc. This whitelist table may denote the specific mobile device via a unique identifier, such as a MAC ID and/or a combination of a model and a serial number of the mobile device.

Document engine 325 may receive a request for the captured image file and provide the captured image file document upon a determination that the request comprises the security key associated with the physical document. In some implementations, document engine 325 may execute receive request instructions 130 to receive a request for a captured image file of the physical document. In some implementations, the request for the captured image file may comprise a request to perform the image capture operation on the physical document and/or a request for a copy of a stored version of the captured image file. For example, the physical document may not have been scanned before the key is generated by instructions 125, in which case the request may be to perform a first scan operation on the document. For another example, the physical document may have already been scanned and the request may be to perform a second scan operation and/or may comprise a request for a resulting file from the first scan operation.

The request may be evaluated to determine whether the generated security key has been provided, and the request for the file and/or operation may be denied if not. In some implementations, instructions 130 may notify the user of a unauthorized attempt to request the captured image file upon determining that the request does not comprise the security key.

In some implementations, document engine 325 may execute provide file instructions 135 to provide the captured image file of the physical document upon determining that the request comprises the security key. For example, device 110 may transmit the file to the user according to the request, such as by transferring the data over a network connection to a user-selected storage location, emailing the file, sending the file to the requesting user's computing and/or mobile device, etc.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine-readable storage medium having stored thereon machine-readable instructions executable to cause a processor to:
   in response to receiving a first request to perform optical image capture of a physical document, cause a scanner device to optically scan the physical document a first time to generate an image file of the physical document;
   generate a security key associated with the physical document, based on the image file of the physical document, wherein the security key is further generated according to an authentication credential received from a mobile device of a user from which the first request was received;
   provide the image file of the physical document and the security key to fulfill the first request;
   in response to receiving a second request to perform the optical image capture of the physical document, cause the scanner device to optically scan the physical document a second time to regenerate the image file of the physical document;
   after the scanner device has optically scanned the physical document the second time to regenerate the image file of the physical document, determine whether the second request to perform the optical image capture of the physical document includes the security key generated based on the image file of the physical document the first time the physical document was optically scanned; and
   in response to determining that the second request includes the security key, provide the image file of the physical document that was regenerated by the scanner device, wherein the image file was regenerated prior to determining that the second request includes the security key, to fulfill the second request.

2. The medium of claim 1, wherein the security key is further generated according to a characteristic of the physical document.

3. The medium of claim 1, wherein the machine-readable instructions are executable by the processor to further:
   in response to determining that the second request does not include the security key, not providing the image file of the physical document, such that the second request is not fulfilled.

4. The medium of claim 1, wherein the security key is generated for use by a specific client device associated with a user and from which the first request was received.

5. The medium of claim 1, wherein the authentication credential received from the mobile device comprises at least one of the following: a device identifier, a user identifier, a password, and a user selected credential.

6. The medium of claim 1, wherein the machine-readable instructions are executable by the processor to further:
   in response to determining that the second request does not include the security key, preventing physical access to the physical document within the scanner device in which the physical document was optically scanned both the first time and the second time.

7. The medium of claim 1, wherein the machine-readable instructions are executable by the processor to further:
   in response to determining that the second request does not include the security key, notify a user from which the first request was received of an unauthorized attempt to receive the image file of the physical document.

8. A method comprising:
   in response to receiving a subsequent request to perform optical image capture of a physical document, causing, by a processor, a scanner device to optically scan the physical document to generate an image file of the physical document;
   after the scanner device has optically scanned the physical document to generate the image file of the physical document, determining, by a processor, whether the subsequent request to perform optical image capture of the physical document includes a security key generated based on an image file of the physical document generated a first time the physical document was optically scanned using the scanner device, wherein the security key is further generated according to an authentication credential received from a mobile device of a user from which a first request was received;
   in response to determining that the subsequent request includes the security key, providing, by the processor, the image file of the physical document that was generated by the scanner device optically scanning the physical document in response to receiving the subsequent request and that was generated prior to determining that the subsequent request includes the security key, to fulfill the subsequent request; and
   in response to determining that the subsequent request does not include the security key, not providing, by the processor, the image file of the physical document that was generated by the scanner device in response to receiving the subsequent request, such that the subsequent request is not fulfilled.

9. The method of claim 8, wherein the security key is provided to a mobile device associated with a user from whom a first request to perform the optical image capture of the physical document was received.

10. The method of claim 9, further comprising:
    providing the security key to the mobile device associated with the user upon verifying that the mobile device associated with the user is included within a trusted whitelist table of mobile devices.

11. The method of claim 9, wherein the subsequent request is received from a second device associated with the user and that is configured to retrieve the security key from the mobile device.

12. The method of claim 8, wherein the security key is generated according to a characteristic of the physical document.

13. An apparatus comprising:
    a scanner device to optically scan a physical document to generate an image file of the physical document;
    a processor;
    a memory storing instructions executable by the processor to:
      in response to receiving a first request to perform optical image capture of the physical document, cause the scanner device to optically scan the physical document a first time to generate the image file of the physical document;
      generate a security key associated with the physical document, based on the image file of the physical document, wherein the security key is further generated according to an authentication credential received from a mobile device of a user from which the first request was received;

provide the image file of the physical document and the security key to a user associated with the physical document and from which the first request was received;

in response to receiving a second request to perform the optical image capture of the physical document, cause the scanner device to optically scan the physical document a second time to regenerate the image file of the physical document;

in response to determining that the second request includes the security key generated the first time the physical document was optically scanned, provide the image file document to fulfill the second request; and in response to determining that the second request does not include the security key, preventing physical access to the physical document within the scanner device in which the physical document was optically scanned both in response to the first request and in response to the second request.

* * * * *